Feb. 28, 1939. S. F. ARBUCKLE ET AL Re. 21,013

SIGN

Original Filed May 28, 1930

INVENTORS
Samuel F. Arbuckle,
Guy H. Coulter.
BY
Harness, Dickey, Pierce & Hann,
ATTORNEYS.

Reissued Feb. 28, 1939 Re. 21,013

UNITED STATES PATENT OFFICE 21,013

SIGN

Samuel F. Arbuckle and Guy H. Coulter, Highland Park, Mich., assignors to S. F. Arbuckle Corp., a corporation of Delaware Original No. 2,004,181, dated June 11, 1935, Serial No. 456,786, May 28, 1930. Application for reissue March 15, 1937, Serial No. 130,990

19 Claims. (Cl. 40—136)

This invention relates to signs.

The main objects of this invention are to provide an improved form of sign preferably of the stamped sheet metal type and particularly suitable for use as a motor vehicle license plate; to provide an improved construction of reflecting sign in which the indicia thereon will reflect light from vehicle lamps and the like so as to be clearly visible in the dark; to provide an improved sign which is adapted for use as a highway marker to indicate curves, steep hills, stop streets, railroads and the like; to provide an improved form of license plate which will reflect light for a considerable distance from the lamps of a vehicle approaching the sign; to provide an improved sign in which the indica is provided with reflecting surfaces, the angles of which have been scientifically determined so as to reflect substantially equal amounts of light within certain predetermined angular limits; and to provide a generally improved form of sheet metal vehicle license plate of the light reflecting type which may be economically manufactured in quantity production and which will be vastly superior in serving as both an indicating sign and a warning signal when in use.

An illustrative embodiment of this invention is shown in the accompanying drawing, in which, Fig. 1 is a view in face elevation of one form of my improved invention as adapted to a vehicle license plate.

Figure 1:
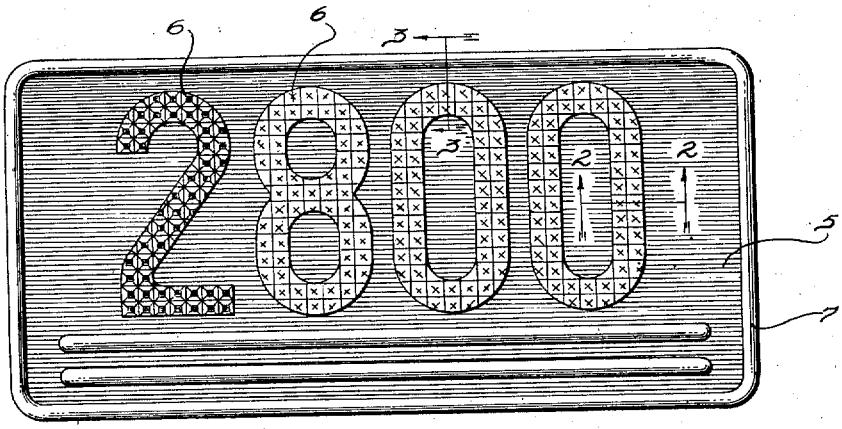
Figure 2:
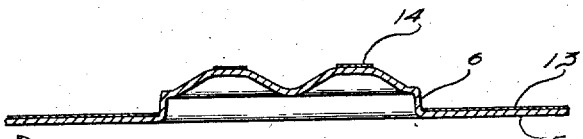
Fig. 2 is an enlarged sectional view taken on the line 2—2 of Fig. 1 looking in the direction indicated.
Figure 3:
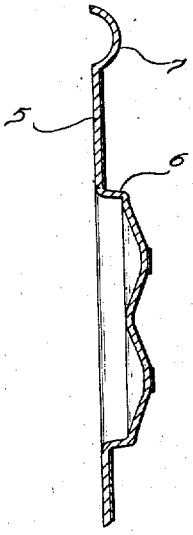
Fig. 3 is an enlarged sectional view taken on the line 3—3 of Fig. 1 looking in the direction indicated.

Heretofore in the construction of signs of this general character, the reflecting surfaces provided thereon have been subject to many objections. Those which had uniformly arranged surfaces have been constructed so that the light shining thereon would be reflected at substantially only one or two angles and, therefore, if the observer was not positioned or stationed at the exact correct angle, he would not see the reflected light.

In another type, the reflecting surfaces have been positioned at promiscuous angles and although the light could be seen at a plurality of different positions, nevertheless, it would be dispersed so greatly that it would not be reflected for any material distance, particularly not a sufficient distance to serve as a warning to an approaching car traveling at a high rate of speed.

In my improved construction the reflecting surfaces are so arranged that light will be reflected at a plurality of predetermined angles in a substantially uniform manner and the angular limits of reflection are so arranged that the angle will be sufficiently wide to take care of an approaching car when it is at one side or the other of the sign. The limits, however, are restricted so that the light will be reflected a sufficient distance to be of value as a warning to a car approaching at a relatively high rate of speed.

In the construction of a license plate, for instance, embodying my improved invention, certain requirements must necessarily be met. One of these requirements is that the light be reflected a relatively long distance in order to give ample time for the operator of the car to either slow down or turn aside to avoid collision. Another requirement is that the light be reflected only within certain predetermined limits in a horizontal plane so that the driver of the car approaching at a position slightly to one side of the other of the car carrying the sign will be warned by the light reflected therefrom. This angle of dispersion in a horizontal plane must necessarily be greater than the angle of dispersion or reflection in a vertical plane due to the fact that the line of vision of the driver of any approaching car is substantially the same height, within narrow limits, from the roadway.

The arrangement of the reflecting surfaces must also be such that they will reflect light which is reflected from the roadway. This is made necessary by the almost universal use of double filament head lights which project the driving light forwardly and downwardly onto the roadway and which are arranged so that in many instances the light from the car head lights will not strike directly onto the license plate of the car ahead.

Owing to the practice of the motor car manufacturers in installing their license plate brackets on automobiles, there is a difference of fifteen degrees in the angle of the inclination from vertical on the license plates of new cars. It, therefore, follows that in making a license plate with reflecting surfaces on the indicia, these reflecting surfaces must be so formed as to reflect a light from the tail lamp over a larger angle than fifteen degrees or the light shining upon these surfaces will be reflected onto the ground and not into the eyes of a driver of a car approaching from the rear. At the same time, if the angle of the reflecting surface is too great, thus reflecting the light over too great an angle, these numerals will not be visible at a great enough distance and as one of the main objects in a plate of this type is that it act as a reflecting signal from the lights of an approaching car, in case the tail lamp of the car carrying the plate is not burning, the dispersion sideways of the indicia must be such that the plate may be observed within an angle of fifteen to thirty degrees to each side of the vehicle. If reflected over a much wider angle it cannot be seen from a sufficient distance to amply warn the driver in time to either slow up or turn aside.

Therefore, it follows that the different angles of the reflecting surface of these numerals must be held to very close dimensions and at the same time they must be so arranged as to allow a polishing wheel, during the manufacture of the article, to strike and polish all of the raised surfaces of the indicia.

In my improved invention this has been accomplished by arranging uniform rows of what is herein termed semi-frusto-pyramids, the faces of which are spaced apart to form valleys which run lengthwise and crosswise at right angles to each other of the indicia upon which they are formed.

This arrangement of reflecting surfaces permits all of the surfaces to be polished by running the plate carrying the indicia under polishing wheels from just two directions which are at right angles to each other and thus enables the devices to be automatically handled in quantity production.

It is customary in the manufacture of motor vehicle license plates to paint the background of the plate one color and then paint the tops of the embossed indicia thereon a contrasting color. In the present instance, the reflecting surfaces of the indicia replace the latter painting.

The tops of the semi-frusto-pyramids may, however, be coated with paint so that the indicia appears outlined by a series of dots.

The advantages of this plate would be that the plate could be placed on the car at the best angle to serve as a reflex signal in case the tail lamp of the car was out and no attention would have to be paid to placing this plate at the correct angle to the source of light in the tail lamp itself as the numerals would appear when illuminated by the tail light as the numerals may be of dots of color and while if placed at the correct angle with respect to the tail light, would show up brilliantly due to the reflection of the light from the tail light from the sides of the pyramids.

In the construction shown in the drawing, the invention has been embodied in a vehicle license plate 5 which has indicia in the form of numerals 6 embossed thereon and a bead 7 embossed around the marginal edges of the plate.

Figure 4:
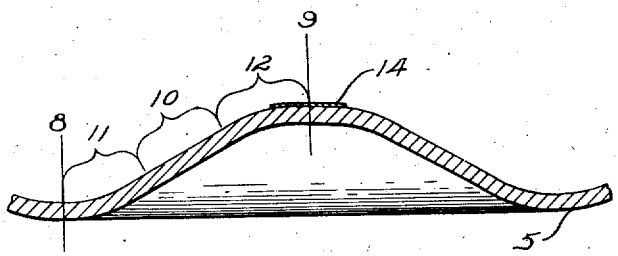
Fig. 4 is a further materially enlarged sectional view of one of the semi-frusto-pyramidal deformations of the indicia illustrating the curvature and arrangement of the reflecting surfaces.

The indicia 6 is deformed to provide a plurality of reflecting surfaces which in this instance are termed semi-frusto-pyramids. These deformations are generally of frusto-pyramidal shape but as shown in Fig. 4 of the drawing only about one-third of the surface between the points 8 and 9, as shown below the bracket 10, is a plane surface.

The portion indicated by the bracket 11 is curved concavely and the portion indicated by the bracket 12 is curved convexly. This particular curvature of the deformations is very important. When used and embodied in vehicle license plates, highway marker signs and the like, the surface 10 on the sides of the semi-frusto-pyramids, when viewed in normal position in a horizontal direction are positioned at an angle of substantially thirty degrees from the face of the plate and on the opposite two sides which reflect lgiht in vertical plane, this portion is positioned at an angle of substantially twenty degrees from the general plane of the plate.

These deformations of semi-frusto-pyramidal shape are arranged in spaced parallel rows and aligned in directions perpendicular to each other, thus providing a plurality of reflecting surfaces arranged to reflect substantially equal amounts of light within predetermined angular limits.

As is customary in the manufacture of vehicle license plates the background of the plate is provided with a coat of paint 13 and in some instances the tops or crowns of the deformations may also be tipped with paint as shown at 14.

In the use of this license plate, the reflecting surfaces 10, 11 and 12 reflect light from the tail lamp rearwardly so as to shine in the eyes of an approaching driver, thus giving him a warning signal of great brilliance as compared with devices of this character in present time use.

The angular disposition of these surfaces is such that light will be properly reflected at the proper angle to accomplish this result even though the bracket which carries the license plate may vary in angular position within the usual limits from the vertical.

In the event the tail light mounted in conjunction with the license plate should not be functioning, light from the head lamps of an approaching car will be reflected from these surfaces in substantially uniform amounts within the predetermined desired angular range or limit and this limit is so proscribed as to reflect light a sufficient distance to give ample warning for permitting the approaching car driver either to slow down or turn aside so as to avoid collision.

The angular limits in a horizontal plane are wider than the limits in a vertical plane so as to be visible to a car driver approaching at either side of the car equipped with these plates. The vertical dispersion or reflection range limits is such that lights striking directly thereon from head lamps will be reflected into the eyes of the driver as well as light reflected from a wet pavement against the license plate and thence back to the driver of the approaching car.

It will be understood, of course, that separate indicia units having, for instance, letters to form words for warning drivers of curves, stop streets and the like and which are adaptable for fastening or securing to present existing signs may be readily constructed in accordance with the disclosure herein.

When we speak of indicia we intend the broad construction of the word as applying not only to letters and figures, but also to the shape of the sign itself. In this construction, the shape of the sign is a discriminating mark or indicia as applied to distinct sign outlines, such as those for indicating left hand curves, cross streets, Federal highways, State highways and the like. It is to be understood that the entire surface of the indicia may be covered with the unit reflecting surfaces, in which case the numerals and/or the letters may be left plain, that is to say, without reflecting surfaces. The indicia may be in outline form to surround the letters of the sign so as to reflect its particular shape to an area about the light source so that the shape or outline of the indicia may be quickly and readily discernible to a vehicle operator.

We have specified that, for the purpose of effecting the polishing of the rows of reflecting surfaces, we preferably mount the surfaces in vertical and horizontal rows. It is to be understood, however, that our invention is not to be considered as being limited to this particular positioning of the surfaces but that any other method of relating the surfaces, such as in rows which are in staggered relation, or in diagonal rows or when irregularly positioned, falls within the purview of our invention of predetermining the reflection of light rays from surfaces formed on metal sheet material.

As indicated in the numerals of the license plate, certain of the reflecting surfaces are formed entirely circular in shape, while others are only partially circular for aiding in directing light in a particular direction and at the same time to prevent light from being wasted by reflecting it in any other direction. It will, therefore, be apparent that it is within the purview of our invention not only to provide a plurality of completely circular reflecting units for an indicia, but also to provide partially circular reflecting surfaces to direct all of the impinging light rays in a particular direction so as to outline the indicia to an observer with the greatest degree of intensity.

Although but one specific embodiment of this invention has been herein shown and described, it will be understood that numerous details of the construction shown may be altered or omitted without departing from the spirit of this invention as defined by the following claims.

What we claim is:

1. A sheet metal plate having indicia thereon, said indicia having a plurality of surfaces inclined to the plane of the plate for reflecting light at a plurality of angles, said surfaces being arranged to reflect light at a greater angle in one plane than in a plane at an angle thereto.

2. A sheet metal plate having indicia thereon, said indicia having a plurality of uniformly aligned surfaces inclined to the plane of the plate for reflecting light at a plurality of angles, said surfaces being arranged to reflect light at a greater angle in one plane than in a plane at an angle thereto.

3. A sheet metal plate having indicia thereon, said indicia having a plurality of surfaces inclined to the plane of the plate for reflecting light at a plurality of angles, said surfaces being arranged to reflect light at a greater angle in one plane than in a plane perpendicular thereto, said surfaces being uniformly aligned in two directions.

4. A stamped sheet metal indicium having a plurality of semi-frusto-pyramidal surfaces thereon joined by smooth curved surfaces for reflecting substantially equal amounts of light within predetermined angular limits.

5. A stamped sheet metal indicium having indicia elements embossed thereon, said elements having concave and convex surfaces arranged in an alternating manner, and a substantially plain surface portion between the concave and convex portions.

6. A stamped sheet metal indicia having a semi-frusto-pyramidal projection embossed thereon, each side surface of the projection having an arcuate portion.

7. A stamped sheet metal indicia having a semi-frusto-pyramidal projection embossed thereon, each side surface of the projection having an arcuate portion and a plain portion.

8. A stamped sheet metal indicia having a semi-frusto-pyramidal projection formed thereon, each side surface of the projection having a concave and a convex portion.

9. A stamped sheet metal indicia having a semi-frusto-pyramidal projection embossed thereon, each side surface of the projection having concave and convex portions and a plain surface portion.

10. An element having formed indicium thereon for conveying information, in combination, reflecting surfaces on said indicium which are joined by smooth curved surfaces and disposed in rows at an angle to each other, said indicium having areas thereon which are non-reflecting in the shape of said indicium.

11. An element having a plurality of curved surfaces extending in one direction and a plurality of substantially continuous curved surfaces intersecting said first-mentioned curved surfaces, the arc to which said curved surfaces conform being so related to the height of the arc as to limit said reflection of all of the impinging rays of light from a source to within a predetermined limited area.

12. An element having a plurality of intersecting, substantially continuous curved reflecting surfaces, the curvature on one axis of said surfaces limiting the reflection of the impinging rays of light from a source in width, the curvature on another axis of said surfaces limiting the impinging rays of light from said source in breadth, said combined curved surfaces limiting the reflection of all of the impinging rays of light from said source to within a predetermined limited area.

13. An element having a plurality of intersecting, substantially continuous curved reflecting surfaces, the curvature on one axis of said surfaces limiting the reflection of the impinging rays of light from a source in width, the curvature on another axis of said surfaces limiting the impinging rays of light from said source in breadth, said combined curved surfaces limiting the reflection of all of the impinging rays of light from said source to within a predetermined limited area, the width and breadth of said area being variable through the change in curvature of said surfaces.

14. An element having a plurality of intersecting substantially continuous curved reflecting surfaces, the curvature on one axis of said surfaces limiting the reflection of the impinging rays of light from a source in width, the curvature on another axis of said surfaces limiting the impinging rays of light from said source in breadth, and combined curved surfaces limiting the reflection of all of the impinging rays of light from said source to within a predetermined limited area, said surfaces being so related as to have the light reflected from said surfaces disposed in continuous bands.

15. An element having a reflecting surface comprising a semi-frusto-pyramidal projection formed thereon, each side surface of the projection having a concave and a convex portion.

16. An element having a plurality of curved surfaces extending in one direction and a plurality of curved surfaces disposed at an angle thereto, the intersection of said surfaces forming reflecting areas spaced between said surfaces, forming continuous intersecting valleys disposed at an angle to each other and joined to said area, the curvature of said areas and valleys being such as to limit the reflection of all of the impinging rays of light from a source to within a predetermined limited area.

17. A flat metal element having a plurality of curved surfaces extending in one direction and a plurality of substantially continuous curved surfaces intersecting said first-mentioned curved surfaces, the curvature of said surfaces being related in height and shape.

18. A flat metal element having a plurality of curved surfaces extending in one direction and a plurality of substantially continuous curved surfaces intersecting said first-mentioned curved surfaces, said surfaces being mirrored.

19. An element having mirrored areas in the nature of pyramids each side surface having an arcuate portion.

SAMUEL F. ARBUCKLE.
GUY H. COULTER.